United States Patent
Mauer

(10) Patent No.: US 11,101,743 B2
(45) Date of Patent: Aug. 24, 2021

(54) METHOD AND DEVICE FOR OPERATING A MULTI-PHASE ELECTRIC MACHINE

(71) Applicant: Robert Bosch GmbH, Stuttgart (DE)

(72) Inventor: Jakob Mauer, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/964,898

(22) PCT Filed: Nov. 23, 2018

(86) PCT No.: PCT/EP2018/082391
§ 371 (c)(1),
(2) Date: Jul. 24, 2020

(87) PCT Pub. No.: WO2019/145068
PCT Pub. Date: Aug. 1, 2019

(65) Prior Publication Data
US 2021/0036633 A1  Feb. 4, 2021

(30) Foreign Application Priority Data
Jan. 24, 2018 (DE) ...................... 10 2018 201 072.2

(51) Int. Cl.
*H02M 7/5395* (2006.01)
*H02M 7/5387* (2007.01)
*H02P 27/08* (2006.01)

(52) U.S. Cl.
CPC ..... *H02M 7/5395* (2013.01); *H02M 7/53873* (2013.01); *H02M 7/53875* (2013.01); *H02P 27/085* (2013.01); *H02M 7/53876* (2021.05)

(58) Field of Classification Search
CPC ......... H02M 7/53875; H02M 7/53873; H02M 7/5395; H02M 7/5387; H02M 2007/53876; H02P 27/085; H02P 27/08
See application file for complete search history.

(56) References Cited

U.S. PATENT DOCUMENTS

2006/0267542 A1   11/2006   Wei et al.
2010/0007300 A1   1/2010   Hein et al.
(Continued)

FOREIGN PATENT DOCUMENTS

| | | |
|---|---|---|
| DE | 102012220247 | 5/2014 |
| EP | 0658969 | 6/1995 |
| JP | 2009100613 | 5/2009 |

OTHER PUBLICATIONS

International Search Report for Application No. PCT/EP2018/082391 dated Feb. 4, 2019 (English Translation, 3 pages).
(Continued)

*Primary Examiner* — Adolf D Berhane
(74) *Attorney, Agent, or Firm* — Michael Best & Friedrich LLP

(57) ABSTRACT

The present invention relates to a method and device for operating a multi-phase electric machine. The method comprises the steps of: determining a working point; determining a provisional switching frequency for a pulse width modulation for each of the electrical phases of the multi-phase electric machine; determining a respective modulation function curve (m1, m2, m3) for the pulse width modulation for each of the electrical phases of the multiphase electric machine; determining at least one time period (Tmod) in the modulation function curves (m1, m2, m3) as a function of the values of the provisional modulation function curves in the time period (Tmod); changing the provisional switching frequency of the pulse width modulation towards a modified switching frequency in the at least one determined time period (Tmod); and generating a switching signal for each of the electrical phases by pulse width modulation based upon the determined modulation function curves (m1, m2, m3) using the modified switching frequency in the at least one determined time period (Tmod).

16 Claims, 3 Drawing Sheets

(56) References Cited

U.S. PATENT DOCUMENTS

| | | |
|---|---|---|
| 2012/0212167 A1 | 8/2012 | Wu et al. |
| 2014/0070755 A1 | 3/2014 | Baek et al. |
| 2015/0054439 A1* | 2/2015 | Dittmer .................. H02M 1/32 |
| | | 318/400.21 |
| 2017/0349059 A1 | 12/2017 | Xu et al. |
| 2018/0175627 A1* | 6/2018 | Woodburn ................ H02J 3/00 |
| 2020/0021184 A1* | 1/2020 | Frampton .............. H02H 9/042 |

OTHER PUBLICATIONS

Specovius, Joachim, "Grundkurs Leistungselektronik: Bauelemente, Schaltungen und Systeme" [An overview of power electronics: components, circuits and systems]; Springer Vieweg; Edition: 8 (Jan. 24, 2017); pp. 160-162 (Statement of Relevance attached).

* cited by examiner

METHOD AND DEVICE FOR OPERATING A MULTI-PHASE ELECTRIC MACHINE

BACKGROUND OF THE INVENTION

The present invention relates to a method for operating a multiphase electrical machine and to a device for operating a multiphase electrical machine. The multiphase electrical machine may in particular be a three-phase, a six-phase or a nine-phase electrical machine. The multiphase electrical machine may be a multiphase electric drive.

The invention thus relates in particular to a method and to a device for operating a multiphase electric drive, in particular of an electric vehicle or of a hybrid vehicle (hybrid electric vehicle, HEV), in particular of a plug-in hybrid (plug-in hybrid electric vehicle, PHEV).

Multiphase electrical machines are usually supplied via inverters, which are also known as inverter circuits, with modulation functions, adapted for the operation of the electrical machine, for each of the electrical phases. In this case, an operating point is usually set for the multiphase electrical machine depending on a desired torque of the electrical machine and on an electrical frequency of the electrical machine. The respectively set operating point contains a fixed switching frequency for the pulse width modulation for achieving the desired modulation function profiles and a drive method.

By way of example, at low and medium electrical frequencies $f_{el}$, space vector modulation (space vector pulse-width modulation, SVPWM) may be applied, and at higher electrical frequencies $f_{el}$ synchronous clocking may be used, or the like.

The switching frequency is in this case usually selected such that a balance is maintained between small deviations of the real electrical phases from the desired modulation function profiles, for which a particularly small switching frequency is advantageous, on the one hand, and switching losses that are as low as possible, for which a switching frequency that is as great as possible is advantageous, on the other hand.

DE 10 2012 220 247 A1 describes one exemplary inverter circuit of an electric drive, an electric vehicle having an inverter circuit and a method for operating an inverter circuit.

Basic power electronics elements are known for example from Joachim Specovius: "Grundkurs Leistungselektronik: Bauelemente, Schaltungen and Systeme" [An overview of power electronics: components, circuits and systems]; Springer Vieweg; Edition: 8 (Jan. 24, 2017); ISBN-10: 3658169109.

It is always desired to provide power electronics and a corresponding operating method that optimize the operation of a multiphase electrical machine.

SUMMARY OF THE INVENTION

The present invention discloses a method and a device.

What is accordingly provided is: a method for operating a multiphase electrical machine, having the steps of:
determining an operating point of the multiphase electrical machine;
determining, for pulse width modulation for each of the electrical phases of the multiphase electrical machine, a provisional switching frequency depending on the determined operating point of the multiphase electrical machine;
determining a respective modulation function profile for the pulse width modulation for each of the electrical phases of the multiphase electrical machine;
determining at least one time period in the modulation function profiles depending on the values of the provisional modulation function profiles in the time period;
changing the provisional switching frequency of the pulse width modulation to a modified switching frequency in the at least one determined time period; and
generating a switching signal for each of the electrical phases through pulse width modulation based on the determined modulation function profiles using the modified switching frequency in the at least one determined time period.

The term modulation function, the temporal profile of which is under consideration and modified here, is explained in detail for example in section 13.1.4 of the book "Grundkurs Leistungselektronik: Bauelemente, Schaltungen and Systeme" cited in the introduction. The modulation function may be referred to as a brief voltage average value of an intermediate circuit voltage over a switching period.

The at least one time period that is determined and in which the switching frequency is changed or modified may also be referred to as "modification time period".

What is furthermore provided is a device for operating a multiphase electrical machine, having:
a computing apparatus, that is designed to:
determine an operating point of the multiphase electrical machine;
determine, for pulse width modulation for each of the electrical phases of the multiphase electrical machine, a provisional switching frequency depending on the determined operating point of the multiphase electrical machine;
determine a respective modulation function profile for the pulse width modulation for each of the electrical phases of the multiphase electrical machine;
determine at least one time period in the modulation function profiles depending on the values of the provisional modulation function profiles in the time period;
change the provisional switching frequency of the pulse width modulation to a modified switching frequency in the at least one determined time period;
a circuit apparatus that is designed to implement the modulation function profile for each of the electrical phases of the multiphase electrical machine through pulse width modulation; and
a signal generation apparatus for generating a switching signal for the circuit apparatus for the pulse width modulation for each of the electrical phases based on the determined modulation function profiles using the modified switching frequency in the at least one determined time period.

The device for operating the multiphase electrical machine may also be referred to as an inverter or as an inverter circuit.

The invention furthermore provides a vehicle that comprises a device according to the invention for operating a multiphase electrical machine and the electrical machine to be operated. The multiphase electrical machine to be operated may in particular be a drive of the vehicle. The vehicle may in particular be a hybrid vehicle (HEV) or a plug-in hybrid (PHEV).

The finding on which the present invention is based is that the switching frequency for the pulse width modulation constitutes an additional degree of freedom, not previously taken into consideration, when driving or operating a multiphase electrical machine.

As a result of changing the original, provisional switching frequency, as is usually set, to a modified switching frequency under certain conditions and for certain durations, it is possible to reduce or minimize power losses for an electrical machine, in particular for a drive.

In other words, one core concept of the invention is that the switching frequency for pulse width modulation for operating the electrical machine is not fixed over a switching period $1/f_{el}$, but rather is modified at least once.

Advantageous embodiments and developments become apparent from the dependent claims and from the description with reference to the figures.

According to one preferred development, the at least one time period is determined based on at least one difference between at least two modulation function profiles. It has specifically been recognized that, using the relative relationship between the values of the modulation function profiles, it is possible to identify and determine those time periods in which it is particularly advantageous to change the provisional switching frequency.

According to a further preferred development, the at least one time period is determined based on all of the possible differences between two respective modulation function profiles. It is thereby possible to determine as many time periods as possible in which the provisional switching frequency is changed to the modified switching frequency. It is thus possible overall to achieve a further reduction in power losses or switching losses.

According to a further preferred development, each time period in which any difference between any two modulation function profiles has an absolute value (abs) less than or equal to ($\leq$) a threshold value is determined as the at least one determined time period ("modification time period").

If the threshold value is referred to as mTol and the modulation function profiles are referred to as $m_i$ for the ith electrical phase, then each time period may be determined as the at least one determined time period (that is to say determined as modification time period) in which the following applies for any value of i and any value of j:

$$\text{abs}(m_i(t) - m_j(t)) \leq mTol.$$

For the specific case with three electrical phases, there are therefore three modulation function profiles $m_1(t)$, $m_2(t)$ and $m_3(t)$, and each time period is determined as a modification time period in which the following applies:

$$\text{abs}(m1(t) - m2(t)) \leq mTol \| \text{abs}(m1(t) - m3(t)) \leq mTol \| \text{abs}(m2(t) - m3(t)) \leq mTol,$$

wherein the symbol "$\|$" stands for "or".

It goes without saying that the formula explained above may also be applied accordingly for more than three electrical phases, for example for six or nine electrical phases.

According to a further preferred development, the method according to the invention comprises the step of: determining the threshold value, mTol, based on a torque and/or a speed of the multiphase electrical machine. The threshold value may be determined for example using a preproduced lookup table (LUT). Lookup tables, which are also called conversion tables, are commonly used in information technology and digital technology in order to statically define information and to use said information at runtime of a program so as to avoid relatively complex calculations or high memory consumption. A device that is designed to execute the method according to the invention is thus able to be implemented with comparatively fewer resources.

According to a further preferred development, the method according to the invention comprises the step of: determining the modified switching frequency based on a torque and/or a speed of the multiphase electrical machine. The modified switching frequency may be determined for example using a lookup table. It is also thereby possible to avoid complex calculations and to reduce working memory consumed in order to perform the method. A device for performing the method according to the invention is accordingly able to manage with fewer resources or be implemented with less demanding hardware.

According to a further preferred development, when the switching signal is generated, the provisional switching frequency is retained for each of the electrical phases in all of the time periods that do not lie within one of the modification time periods, that is to say do not lie within the at least one determined time period.

According to a further preferred development, the modified switching frequency is smaller than the provisional switching frequency. Switching losses are thereby able to be minimized.

According to a further preferred development, space vector modulation or sine modulation is used for the pulse width modulation.

BRIEF DESCRIPTION OF THE DRAWINGS

The present invention is explained in more detail below on the basis of the exemplary embodiments illustrated in the schematic figures of the drawing. In the figures.

Method steps are numbered for the sake of clarity, and this is in particular not intended to imply a specific temporal order, unless specified otherwise. Several method steps may in particular also be performed at the same time.

DETAILED DESCRIPTION

Figure 1:
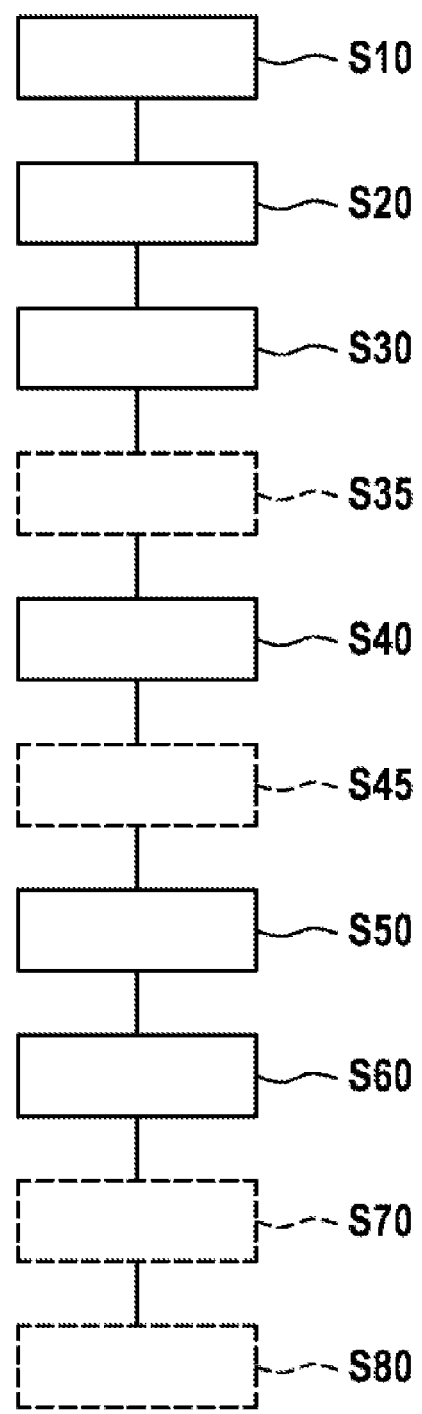
FIG. 1 shows a schematic flowchart for explaining a method according to one embodiment of the present invention.

FIG. 1 shows a schematic flowchart for explaining a method for operating a multiphase electrical machine according to one embodiment of the present invention. Although the exemplary embodiments are explained in connection with a three-phase electrical machine, it goes without saying that the elements, properties and method steps that are mentioned may also be applied in the same way to multiphase electrical machines having more than three phases (for example six-phase or nine-phase electrical machines).

In a step S10, an operating point of the multiphase electrical machine is determined. As is already known in the prior art, the operating point may in particular be determined depending on an electrical frequency $f_{el}$ and/or a desired or current torque M and/or a speed of the multiphase electrical machine. The multiphase electrical machine may in particular be an electric drive, preferably for a vehicle, particularly preferably for an HEV or PHEV.

In a step S20, a provisional switching frequency $f_s$ is determined for a pulse width modulation for each of the electrical phases of the multiphase electrical machine. Space vector modulation or sine modulation may for example be used for the pulse width modulation. The provisional switching frequency is determined depending on the determined operating point of the multiphase electrical machine, wherein a lookup table may for example be used.

In a step S30, a respective modulation function profile is determined (as a function of time) for respective pulse width modulation for each of the electrical phases of the multiphase electrical machine. Explanations of such determined modulation function profiles for the pulse width modulation for each of the electrical phases of the multiphase electrical machine are illustrated in FIG. 3.

Figure 3:
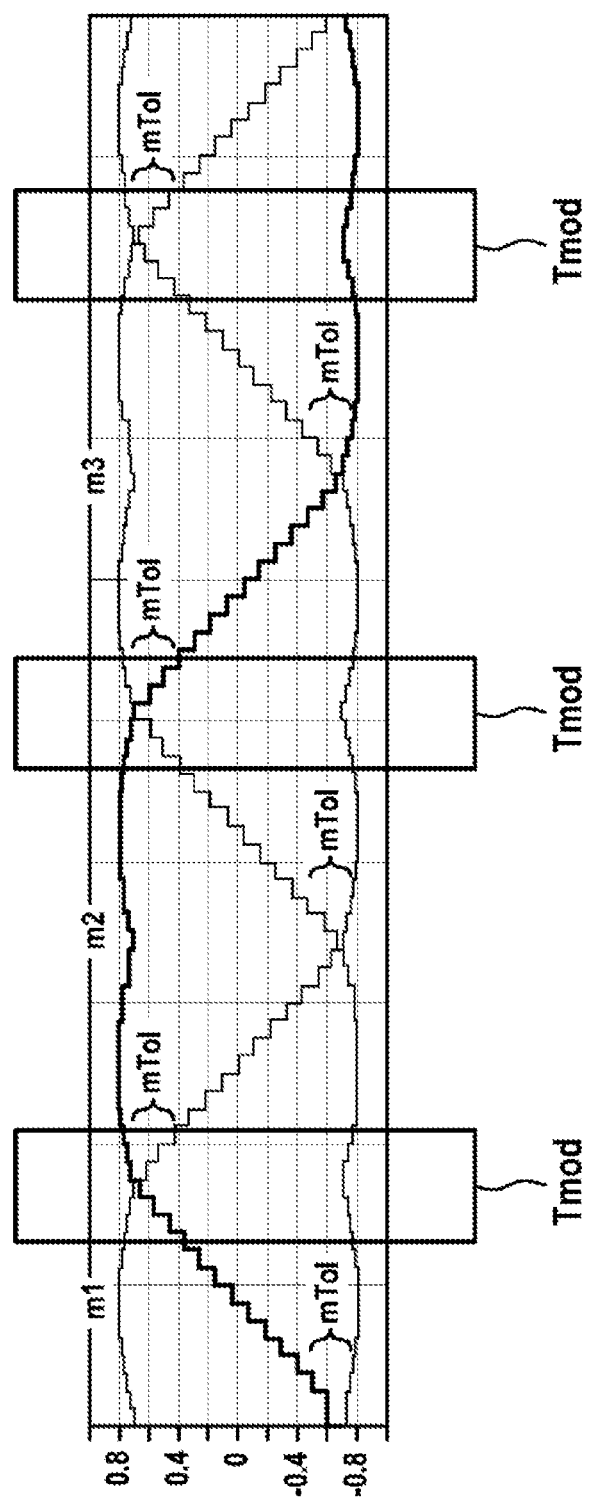
FIG. 3 shows a schematic illustration of modulation function profiles for a three-phase electrical machine.

In FIG. 3, m1 denotes the temporal modulation function profile for a first electrical phase, m2 denotes the temporal modulation function profile for a second electrical phase and m3 denotes the temporal modulation function profile for a third electrical phase.

The modulation function profiles may be determined in the same way as is also usually performed up to now in the prior art.

In a step S40, at least one time period Tmod is then determined, that is to say identified and selected, in the modulation function profiles m1, m2, m3 depending on the values of the provisional modulation function profiles m1(t), m2(t), m3(t). The at least one determined time period Tmod may also be referred to as modification time period Tmod since the provisional switching frequency will be changed later in this time period or in these time periods.

The modification time period Tmod or the modification time periods Tmod is or are preferably determined such that each time period is determined in the form of a modification time period Tmod in which any difference between any two modulation function profiles m1, m2, m3 has a value less than or equal to a threshold value mTol. In order words:

Each time t is determined as belonging to a modification time period Tmod in which the following applies:

$$\mathrm{abs}(m1(t)-m2(t)){\leq}mTol\|\mathrm{abs}(m1(t)-m3(t)){\leq}mTol\|\mathrm{abs}(m2(t)-m3(t)){\leq}mTol,$$

wherein the symbol "||" stands for "or", and wherein each modification time period Tmod is defined by all of the contiguous times t determined as belonging thereto.

The threshold value mTol may be predetermined and fixed, wherein the threshold value mTol may be optimized with regard to the respective multiphase electrical machine to be operated. As an alternative, there may be provision, in an optional step S35, for the threshold value mTol to be determined based on a torque and/or a speed of the multiphase electrical machine, for example using a lookup table. In this case, the threshold value mTol may preferably be determined anew for each switching period $1/f_{el}$.

In a step S50, the provisional switching frequency of the pulse width modulation is changed to a modified switching frequency in the at least one determined time period, that is to say in the determined modification time period Tmod or the several determined modification time periods Tmod. The modified switching frequency may in particular be a switching frequency that is smaller than the provisional switching frequency, resulting in lower switching losses in the modification time periods Tmod.

Advantageously, the provisional switching frequency is changed to the modified switching frequency in all of the modification time periods, whereas the original, provisional switching frequency is retained in all of the time periods that are not modification time periods Tmod, that is to say that do not overlap with any modification time period Tmod.

The switching losses are thereby minimized in time periods in which a reduced switching frequency has little effect, whereas the previously determined provisional switching frequency which was optimized with regard to the determined operating point is used in the remaining time periods where reducing the switching frequency would have a greater effect. It is thus possible overall to set an advantageous balance between the aims for modulation function profiles for the pulse width modulation that are implemented in a particularly precise manner, on the one hand, and switching losses that are as low as possible, on the other hand.

The modification time periods Tmod may be determined by setting a flag in the presence of the abovementioned conditions for determining the modification time periods Tmod (for example a flag bit is set from 0 to 1), wherein the activated flag (for example the flag bit) means that a modification time period Tmod is present and a non-activated flag (for example a flag bit set to 0) means that no modification time period Tmod is present, that is to say that the original provisional switching frequency should be used.

The modified switching frequency may be fixedly prescribed, for example in the form of an absolute value. As an alternative, the modified switching frequency may be determined as a fixedly prescribed relative value, for example in the form of a predetermined percentage of the respective determined provisional switching frequency. In other words, there may be provision, in step S50, for the provisional switching frequency to be reduced within the modification time periods Tmod in each case to a predetermined percentage of the provisional switching frequency. The predetermined percentage may be for example a percentage of 75% or less, preferably of 50% or less, particularly preferably of 25% or less.

As an alternative, there may also be provision for the modified switching frequency to be determined in an optional step S45, for example depending on a torque and/or on a speed of the multiphase electrical machine. There is particularly preferably provision for a lookup table in which values for the modified switching frequency are prescribed in each case depending on the torque and/or on the speed of the multiphase electrical machine.

The modified switching frequency, which may also be referred to as optimized switching frequency, may furthermore be determined depending on further parameters or may be determined using a lookup table that contains further parameters, for example the threshold value, in particular if optional method step S35 for determining the threshold value mTol is performed. If the modified switching frequency is not fixed, it may preferably be determined anew for each switching period $1/f_{el}$.

In a step S60, a switching signal is generated for each of the electrical phases through pulse width modulation, specifically based on the determined modulation function profiles using the modified switching frequency in the at least one determined time period, that is to say in the modification time period Tmod or in the modification time periods Tmod.

The transition between the original, provisional switching frequency and the modified switching frequency is advantageously symmetric, such that there are no jumps in switching procedures. In other words, the transition preferably takes places when a zero vector is set.

It goes without saying that the switching signals that are generated may be transmitted to a circuit apparatus for implementing the modulation function profiles (optional step S70) through the corresponding pulse width modulation after they have been generated, and that the multiphase electrical machine may be operated using the modulation function profiles that are implemented (optional step S80).

Figure 2:
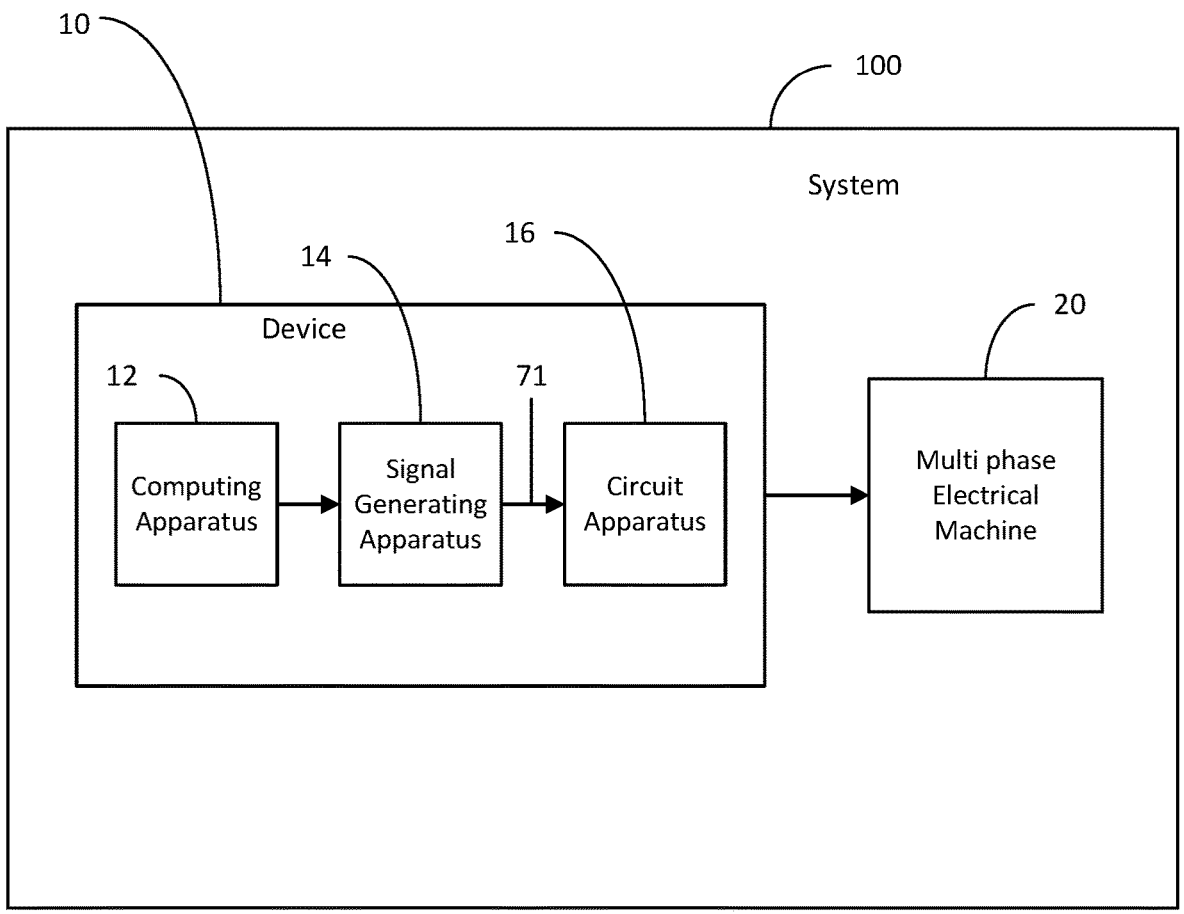
FIG. 2 shows a schematic block diagram for explaining a device according to a further embodiment of the present invention.

FIG. 2 shows a schematic block diagram for explaining a device 10 for operating a multiphase electrical machine 20 according to a further embodiment of the present invention.

The device 10 comprises a computing apparatus 12, a circuit apparatus 16 and a signal generation apparatus 14.

The computing apparatus 10 is designed to perform method steps S10 to S50, possibly including optional method steps S35 and S45, as described above with reference to FIG. 1. The signal generation apparatus 14 is designed to perform method step S60 as described above, that is to say to generate a switching signal 71 for the circuit apparatus 16 for the pulse width modulation for each of the electrical phases based on the determined modulation function profiles using the modified switching frequency in the at least one determined time period, that is to say in the determined modification time period or the determined modification time periods.

The circuit apparatus 16 is designed to implement the modulation function profiles m1, m2, m3 for each of the electrical phases of the multiphase electrical machine 20 through pulse width modulation based on the switching signals 71 generated by the signal generation apparatus 14 (see step S70 above). The multiphase electrical machine 20 may be coupled to the device 10 such that the multiphase electrical machine is operated with the implemented modulation function profiles.

FIG. 2 furthermore illustrates that a system 100 is additionally also provided that comprises the device 10 according to the invention and the multiphase electrical machine 20 operated by way of the device 10. The system 100 may in particular be an electric vehicle (EV), particularly preferably a hybrid vehicle (REV), very particularly preferably a plug-in hybrid vehicle (PHEV). When the modulation function profiles are implemented S70, the corresponding duty cycles (or duty factors) are in particular output as switching signals 71 to individual switches as part of the circuit apparatus 16.

The computing apparatus may in particular be a microcontroller, an application-specific integrated circuit (ASIC). The circuit apparatus 16 may in particular be implemented using two-level technology or multilevel technology. The circuit apparatus 16 may in particular have a bridge branch having two series-connected switching elements for each of the electrical phases of the multiphase electrical machine, wherein a center tap circuit may in particular be used.

Although the present invention has been described above with reference to preferred exemplary embodiments, it is not limited thereto, but rather is able to be modified in many ways. The invention is in particular able to be changed or modified in a variety of ways without departing from the core of the invention.

One core concept of the invention is that the switching frequency for pulse width modulation for operation of a multiphase electrical machine is not fixed over a switching period $1/f_{el}$, but rather is modified at least once, preferably is reduced for a determined time period ("modification time period").

The invention claimed is:

1. A method for operating a multiphase electrical machine (20), comprising:
   determining an operating point of the multiphase electrical machine (20);
   determining, for pulse width modulation for each of the electrical phases of the multiphase electrical machine (20), a provisional switching frequency depending on the determined operating point of the multiphase electrical machine (20);
   determining a respective modulation function profile (m1, m2, m3) for the pulse width modulation for each of the electrical phases of the multiphase electrical machine (20);
   determining at least one time period (Tmod) in the modulation function profiles (m1, m2, m3) depending on the values of the provisional modulation function profiles in the time period (Tmod);
   changing the provisional switching frequency of the pulse width modulation to a modified switching frequency in the at least one determined time period (Tmod); and
   generating a switching signal (71) for each of the electrical phases through pulse width modulation based on the determined modulation function profiles (m1, m2, m3) using the modified switching frequency in the at least one determined time period (Tmod),
   wherein the at least one time period (Tmod) is determined based on at least one difference between at least two modulation function profiles (m1, m2, m3).

2. The method as claimed in claim 1,
   wherein the at least one time period (Tmod) is determined based on all of the differences between two respective modulation function profiles (m1, m2, m3).

3. The method (2) as claimed in claim 2,
   wherein each time period (Tmod) in which any difference between any two modulation function profiles (m1, m2, m3) has a value less than or equal to a threshold value (mTol) is determined.

4. The method as claimed in claim 3, further comprising:
   determining the threshold value (mTol) based on the torque of the multiphase electrical machine (20), the speed of the multiphase electrical machine (20), or both.

5. The method as claimed in claim 1, further comprising:
   determining the modified switching frequency based on the torque of the multiphase electrical machine (20), the speed of the multiphase electrical machine (20), or both.

6. The method as claimed in claim 1,
   wherein, when the switching signal (71) is generated, the provisional switching frequency is retained for each of the electrical phases in time periods (Tmod) outside the at least one determined time period (Tmod).

7. The method as claimed in claim 1,
   wherein the modified switching frequency is smaller than the provisional switching frequency.

8. The method as claimed in claim 1,
   wherein space vector modulation or sine modulation is used for the pulse width modulation.

9. The method as in claim 4, further comprising:
   determining the modified switching frequency based on the torque of the multiphase electrical machine (20), the speed of the multiphase electrical machine (20), or both.

10. The method as in claim 9, further comprising:
    wherein, when the switching signal (71) is generated, the provisional switching frequency is retained for each of the electrical phases in time periods (Tmod) outside the at least one determined time period (Tmod).

11. The method as in claim 10, wherein the modified switching frequency is smaller than the provisional switching frequency.

12. The method as in claim 11, wherein space vector modulation or sine modulation is used for the pulse width modulation.

13. A device (10) for operating a multiphase electrical machine (20), having:

a computer configured to:
determine an operating point of the multiphase electrical machine (20);
determine, for pulse width modulation for each of the electrical phases of the multiphase electrical machine (20), a provisional switching frequency depending on the determined operating point of the multiphase electrical machine (20);
determine a respective modulation function profile (m1, m2, m3) for the pulse width modulation for each of the electrical phases of the multiphase electrical machine (20);
determine at least one time period (Tmod) in the modulation function profiles (m1, m2, m3) depending on the values of the provisional modulation function profiles in the time period (Tmod);
change the provisional switching frequency of the pulse width modulation to a modified switching frequency in the at least one determined time period (Tmod);
a circuit apparatus (16) that is configured to implement the modulation function profile for each of the electrical phases of the multiphase electrical machine (20) through pulse width modulation; and
a signal generation apparatus (14) for generating a switching signal (71) for the circuit apparatus (16) for the pulse width modulation for each of the electrical phases based on the determined modulation function profiles (m1, m2, m3) using the modified switching frequency in the at least one determined time period (Tmod),
wherein the at least one time period (Tmod) is determined based on at least one difference between at least two modulation function profiles (m1, m2, m3).

14. The device as in claim 13, wherein the computer is configured to determine the modified switching frequency based on the torque of the multiphase electrical machine (20), the speed of the multiphase electrical machine (20), or both.

15. The device as in claim 14, wherein the computer is configured to, when the switching signal (71) is generated, retain the provisional switching frequency for each of the electrical phases in time periods (Tmod) outside the at least one determined time period (Tmod).

16. The device as in claim 15, wherein space vector modulation or sine modulation is used for the pulse width modulation.

* * * * *